No. 724,748. PATENTED APR. 7, 1903.
D. A. SIMPSON.
SELF FEEDER FOR THRESHING MACHINES.
APPLICATION FILED NOV. 14, 1902.
NO MODEL.
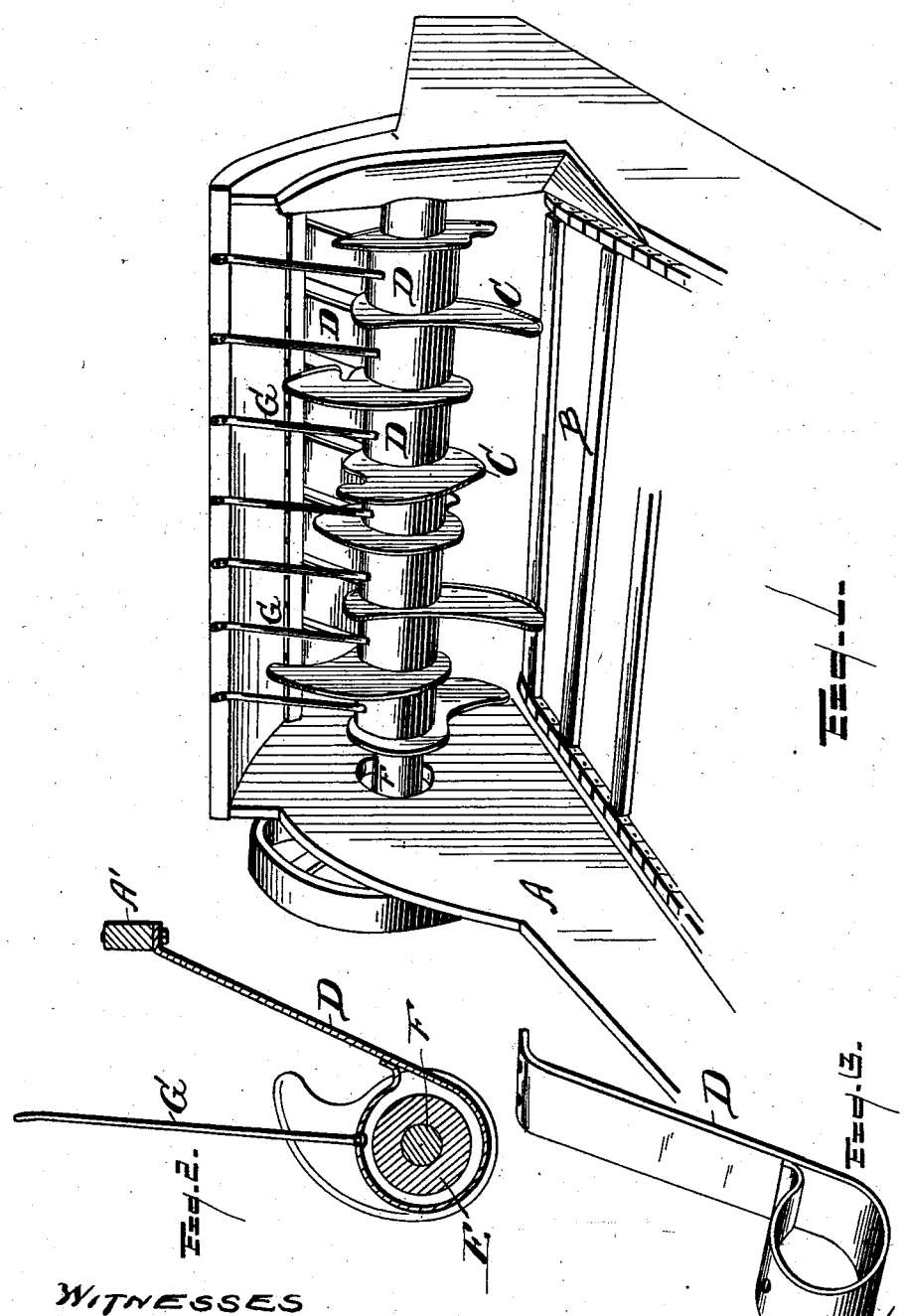
WITNESSES
Hattie Smith
Lillian Crow
INVENTOR
David A. Simpson
By Fisk & Thomas
Attorneys

United States Patent Office.

DAVID ARDEN SIMPSON, OF DEALTOWN, CANADA, ASSIGNOR OF ONE-HALF TO JOSEPH SIMPSON, OF DEALTOWN, CANADA.

SELF-FEEDER FOR THRESHING-MACHINES.

SPECIFICATION forming part of Letters Patent No. 724,748, dated April 7, 1903.

Application filed November 14, 1902. Serial No. 131,317. (No model.)

*To all whom it may concern:*

Be it known that I, DAVID ARDEN SIMPSON, a British subject, residing at Dealtown, county of Kent, Province of Ontario, Canada, have invented a certain new and useful Improvement in Self-Feeders for Threshing-Machines; and I declare the following to be a full, clear, and exact description of the invention, such as will enable others skilled in the art to which it pertains to make and use the same, reference being had to the accompanying drawings, which form a part of this specification.

My invention relates to an improvement in feeders for threshing-machines shown in the accompanying drawings and more particularly set forth in the following specification and claim.

In the drawings, Figure 1 is a view of a portion of the feeder, showing my improvement applied. Fig. 2 is a sectional view through the shaft carrying the cutters, showing the guard in position. Fig. 3 is a perspective view of the guard.

One of the objects of this invention is to provide a suitable guard surrounding the shaft on which the band-cutters are mounted, in order that the sheaf may be guided past the shaft, avoiding any tendency to wind the straw around the shaft between the knives, thereby clogging the feeder.

Another improvement in the construction is the peculiar shape of the knives employed, the form shown being adapted to give a shearing cut, as the knife is cam-shaped, the cutting edge being of greater length than that heretofore employed or found possible in the construction heretofore adopted.

Referring to the letters of reference shown on the drawings, A is the frame of the feeder, B the usual conveyer, and C the cutting-knives.

D D are guards of sheet metal secured to the cross-timber A' of the frame and extending downward therefrom at a suitable angle, the lower part of the guard being cylindrical in form to adapt it to encircle the sleeves E. The sleeves E are the usual form employed to space the cutting-knives on the shaft on which they are mounted, the customary practice being to assemble the knives on the shaft F, placing between each knife a separating-sleeve E, and they securing the knives in the position at which they are set.

G represents stay-rods secured to the frame of the machine and riveted or otherwise engaged to the cylindrical portion of the guard D to secure it, being held concentric with the shaft and against vibration.

The operation of the feed will be readily understood. The bundles are fed in the usual way, and as they pass under the cutters the guard encircling the shaft protects it and insures the straw passing on without any danger of being entangled about the rotating shaft.

Having thus described my invention, what I claim is—

In a feeder for threshing-machines, a plurality of cutters mounted on a suitable shaft, sleeves E separating the cutters, sheet-iron guards located between each of the cutters encircling the sleeves at one end, the other end projecting forward at a tangent from the circular portion and secured to the frame of the machine, and means consisting of a plurality of stay-rods, one end of each rod engaging the circular portion of the guard, the other end of the rod being attached to the frame of the machine, substantially as described.

In testimony whereof I sign this specification in the presence of two witnesses.

DAVID ARDEN SIMPSON.

Witnesses:
 S. E. THOMAS,
 FLORENCE M. SIMPSON.